United States Patent
Zhao

(10) Patent No.: US 11,201,886 B2
(45) Date of Patent: Dec. 14, 2021

(54) SECURITY DETECTION METHOD, DEVICE, AND APPARATUS

(71) Applicant: Advanced New Technologies Co., Ltd., George Town (KY)

(72) Inventor: Hao Zhao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/082,813

(22) Filed: Oct. 28, 2020

(65) Prior Publication Data
US 2021/0075813 A1    Mar. 11, 2021

Related U.S. Application Data

(63) Continuation of application No. PCT/CN2019/095522, filed on Jul. 11, 2019.

(30) Foreign Application Priority Data

Aug. 29, 2018  (CN) .......................... 201810995418.9

(51) Int. Cl.
*H04L 9/00* (2006.01)
*H04L 29/06* (2006.01)
(Continued)

(52) U.S. Cl.
CPC .......... *H04L 63/1425* (2013.01); *G16Y 10/75* (2020.01); *G16Y 30/10* (2020.01);
(Continued)

(58) Field of Classification Search
CPC combination set(s) only.
See application file for complete search history.

(56) References Cited

U.S. PATENT DOCUMENTS

| | | | |
|---|---|---|---|
| 10,637,873 B2 * | 4/2020 | Kurian | H04W 4/029 |
| 10,701,074 B2 * | 6/2020 | Tsao | H04L 63/0884 |

(Continued)

FOREIGN PATENT DOCUMENTS

| | | |
|---|---|---|
| CN | 103532940 | 1/2014 |
| CN | 103619012 | 3/2014 |

(Continued)

OTHER PUBLICATIONS

Cheyun.com [online], "Huawei Wang Yuan: Compared with traditional IT, what is the difference in security protection between the Internet of Things?" Jun. 25, 2017, retrieved on Nov. 9, 2020, retrieved from URL http://www.cheyun.com/cantent/16902>, 16 pages (with machine translation).

(Continued)

*Primary Examiner* — Christopher J Brown
(74) *Attorney, Agent, or Firm* — Fish & Richardson P.C.

(57) ABSTRACT

A computer-implemented method includes obtaining, by one or more processing devices, a wireless message of an Internet of Things (IoT) device by monitoring a wireless signal sent by the IoT device; determining, by the one or more processing devices, a target running feature of the IoT device based on the wireless message; comparing, by the one or more processing devices, the target running feature with a historical normal running feature of the IoT device; and determining, by the one or more processing devices, whether the IoT device runs abnormally based on the comparing of the target running feature with the historical normal running feature of the IoT device.

19 Claims, 6 Drawing Sheets

(51) Int. Cl.
*G16Y 30/10* (2020.01)
*G16Y 10/75* (2020.01)
*H04W 12/121* (2021.01)

(52) U.S. Cl.
CPC .......... *H04L 63/1416* (2013.01); *H04L 63/20* (2013.01); *H04W 12/121* (2021.01)

(56) References Cited

U.S. PATENT DOCUMENTS

| | | | |
|---|---|---|---|
| 10,887,189 B2* | 1/2021 | Guerra | H04L 41/082 |
| 2016/0261465 A1 | 9/2016 | Gupta et al. | |
| 2017/0006052 A1 | 1/2017 | Sheleheda et al. | |
| 2018/0191775 A1* | 7/2018 | Watson | G06N 20/00 |
| 2018/0198818 A1* | 7/2018 | Andrews | H04L 67/12 |
| 2019/0141002 A1* | 5/2019 | Balasubramanian | G06F 40/30 |

FOREIGN PATENT DOCUMENTS

| | | | |
|---|---|---|---|
| CN | 106878339 | 6/2017 | |
| CN | 107135092 | 9/2017 | |
| CN | 107135093 | 9/2017 | |
| CN | 107154940 | 9/2017 | |
| CN | 107426181 | 12/2017 | |
| CN | 108063753 | 5/2018 | |
| CN | 109067763 | 12/2018 | |
| EP | 3361765 A1 * | 8/2018 | H04W 12/06 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Doshi et al., "Machine Learning DDOS Detection for Consumer internet of Thing Devices", IEEE Security anf Privacy Workshops, 7 pages, 2018.
Huang et al., "Research on CRC check in Radio Wave Information Hiding," Internet of Things Technology, May 2017, 5:35-36 (with English abstract).
International Search Report and Written Opinion in International Application No. PCT/CN2019/095522, dated Sep. 18, 2019, 10 pages (with partial English translation).
Nakamoto, "Bitcoin: A Peer-to-Peer Electronic Cash System," www.bitcoin.org, 2005, 9 pages.
PCT International Preliminary Report on Patentability in International Application No. PCT/CN2019/095522, dated Mar. 2, 2021, 12 pages (with partial English translation).
Extended European Search Report in European Appln No. 19854829.9, dated Oct. 11, 2021, 8 pages.

* cited by examiner

Obtain a wireless message of an IoT device, where the wireless message is obtained by monitoring, by using a software wireless technology, a wireless signal sent by the IoT device ⎯202

Determine a target running feature of the IoT device by using the wireless message, and compare the target running feature with a historical normal running feature of the IoT device to determine whether the IoT device runs abnormally ⎯204

FIG. 2

SECURITY DETECTION METHOD, DEVICE, AND APPARATUS

CROSS-REFERENCE TO RELATED APPLICATIONS

This application is a continuation of PCT Application No. PCT/CN2019/095522, filed on Jul. 11, 2019, which claims priority to Chinese Patent Application No. 201810995418.9, filed on Aug. 29, 2018, and each application is hereby incorporated by reference in its entirety.

TECHNICAL FIELD

The present specification relates to the field of security technologies, and in particular, to security detection methods, devices, and apparatuses.

BACKGROUND

Currently, Internet of Things (IoT) devices such as routers, home cameras, smart watches, or smart wristbands are increasingly important in people's work or life, which, however, is accompanied with more attack research and attempts against IoT devices. A low power consumption feature of IoT devices and other factors determine that the IoT devices do not have a complex security detection function. Therefore, how to ensure security of IoT devices becomes an urgent technical problem to be alleviated.

SUMMARY

To alleviate problems in related technologies, the present specification provides security detection methods, devices, and apparatuses.

According to a first aspect of some embodiments of the present specification, a security detection device is provided, where the security detection device is configured to detect an IoT device in an IoT network, and the security detection device includes the following: a software wireless unit, configured to monitor a wireless signal sent by the IoT device to obtain a wireless message; and an analysis unit, configured to determine a target running feature of the IoT device by using the wireless message, and compare the target running feature with a historical normal running feature of the IoT device to determine whether the IoT device runs abnormally.

Optionally, the target running feature/the historical normal running feature includes one or more of the following: a quantity variation feature of IoT devices in an IoT network, an IoT device's wireless message recipient feature, an IoT device's wireless message throughput variation feature, an IoT device's sign-in and sign-off time feature, or an IoT device's service feature.

Optionally, the determine a target running feature of the IoT device by using the wireless message includes the following: if a verification code fails to be verified by verification rules provided by a predetermined communications protocol, but is subsequently verified by private rules, determining that the target running feature of the IoT device includes transmitting a private message.

Optionally, the target running feature/the historical normal running feature includes one or more of the following attack features: an attack instruction feature, a specified attack behavior feature, or an interference signal feature.

Optionally, a hardware capability/a computing capability of the IoT device is less than a specified parameter.

According to a second aspect of some embodiments of the present specification, a security detection method is provided, and the method includes the following: obtaining a wireless message of an IoT device, where the wireless message is obtained by monitoring, by using a software wireless technology, a wireless signal sent by the IoT device; and determining a target running feature of the IoT device by using the wireless message, and comparing the target running feature with a historical normal running feature of the IoT device to determine whether the IoT device runs abnormally.

Optionally, the target running feature/the historical normal running feature includes one or more of the following: a quantity variation feature of IoT devices in an IoT network, an IoT device's wireless message recipient feature, an IoT device's wireless message throughput variation feature, an IoT device's sign-in and sign-off time feature, or an IoT device's service feature.

Optionally, the determining a target running feature of the IoT device by using the wireless message includes the following: if a verification code fails to be verified by verification rules provided by a predetermined communications protocol, but is subsequently verified by private rules, determining that the target running feature of the IoT device includes transmitting a private message.

Optionally, the target running feature/the historical normal running feature includes one or more of the following attack features: an attack instruction feature, a specified attack behavior feature, or an interference signal feature.

Optionally, a hardware capability/a computing capability of the IoT device is less than a specified parameter.

According to a third aspect of some embodiments of the present specification, a security detection apparatus is provided, and the apparatus includes the following: an acquisition module, configured to obtain a wireless message of an IoT device, where the wireless message is obtained by monitoring, by using a software wireless technology, a wireless signal sent by the IoT device; and a determining module, configured to determine a target running feature of the IoT device by using the wireless message, and compare the target running feature with a historical normal running feature of the IoT device to determine whether the IoT device runs abnormally.

Optionally, the target running feature/the historical normal running feature includes one or more of the following: a quantity variation feature of IoT devices in an IoT network, an IoT device's wireless message recipient feature, an IoT device's wireless message throughput variation feature, an IoT device's sign-in and sign-off time feature, or an IoT device's service feature.

Optionally, the determining module is further configured to, if a verification code fails to be verified by verification rules provided by a predetermined communications protocol, but is subsequently verified by private rules, determine that the target running feature of the IoT device includes transmitting a private message.

Optionally, the target running feature/the historical normal running feature includes one or more of the following attack features: an attack instruction feature, a specified attack behavior feature, or an interference signal feature.

Optionally, a hardware capability/a computing capability of the IoT device is less than a specified parameter.

According to a fourth aspect of some embodiments of the present specification, a security detection device is provided, including a software wireless processor, a memory, a main processor, and a computer program that is stored in the memory and that is capable of running on the main processor, where when executing the program, the main processor implements the following method: obtaining a wireless message of an IoT device, where the wireless message is obtained by monitoring, by using the software wireless processor, a wireless signal sent by the IoT device; and determining a target running feature of the IoT device by using the wireless message, and comparing the target running feature with a historical normal running feature of the IoT device to determine whether the IoT device runs abnormally.

Technical solutions provided in some embodiments of the present specification can include the following beneficial effects:

In some embodiments of the present specification, the security detection device can be deployed in the IoT network. IoT devices in the IoT network transmit data by using wireless technologies. The security detection device includes the software wireless unit, and therefore, can monitor all wireless signals within a wireless coverage area, so as to obtain wireless messages of the IoT devices. In some embodiments, the security detection device is used to perform security detection on the IoT devices in the IoT network, without intruding or being in contact with the IoT devices or relying on detection capabilities of the IoT devices. In addition, the security detection device can detect whether the IoT devices run abnormally by obtaining target running features of the IoT devices in combination with historical normal running features, thereby implementing security detection on the IoT devices.

It should be understood that, the general description above and detailed description below are explanatory and are merely examples, and constitute no limitation on the present specification.

BRIEF DESCRIPTION OF DRAWINGS

Accompanying drawings included in the present specification and constructing a part of the present specification show embodiments compliant with the present specification, and explain principles of the present specification jointly with the present specification.

FIG. 2 is a flowchart illustrating a security detection method, according to some example embodiments of the present specification;

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with the present specification. Instead, they are merely examples of apparatuses and methods consistent with some aspects of the present specification as set forth in detail in the appended claims.

The terms used in the present specification are merely for illustrating specific embodiments, and are not intended to limit the present specification. The terms "a" and "the" of singular forms used in the present specification and the appended claims are also intended to include plural forms, unless otherwise specified in the context clearly. It should also be understood that, the term "and/or" used here indicates and includes any or all possible combinations of one or more associated listed items.

It should be understood that, although terms such as "first", "second", and "third" are used in the present specification to describe various information, the information is not limited by these terms. These terms are only used to differentiate between information of the same type. For example, without departing from the scope of the present specification, first information can also be referred to as second information, and similarly, second information can also be referred to as first information. Depending on the context, for example, the word "if" used here can be explained as "while", "when", or "in response to determining".

Figure 1A:
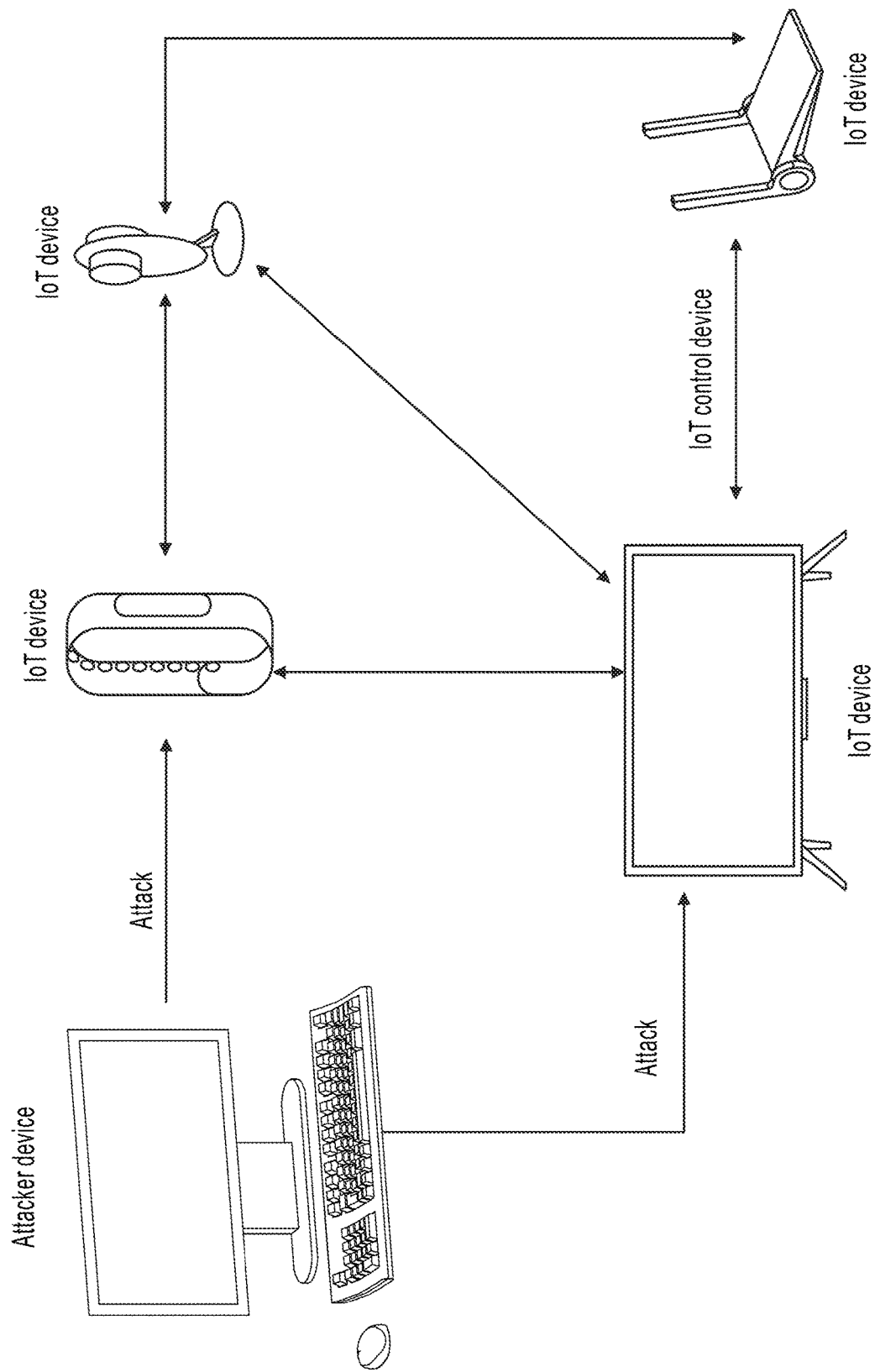
FIG. 1A is a schematic diagram illustrating an IoT network, according to some example embodiments of the present specification.

FIG. 1A is a schematic diagram illustrating an IoT network, according to some example embodiments of the present specification. The IoT network includes multiple IoT devices, an IoT network main controller, and an external attacker device, where the external attacker device is attacking two IoT devices. A smart home scenario is used as an example for illustration in some embodiments shown in FIG. 1A. In actual applications, the IoT network is further widely used in scenarios such as intelligent industrial control scenarios or unmanned retail scenarios.

Manufacturers of IoT devices are diverse, and may not have capabilities and initiatives to conduct security-related investment and research. Some IoT devices do not even have a security detection function. As all operation code embedded in the IoT devices are pre-stored, the IoT devices cannot flexibly update attack detection logic even if they have the security detection function. The IoT devices usually have relatively weak computing capabilities due to the low power consumption feature, and cannot perform additionally complex security detection logic. Therefore, the security detection function is usually relatively weak. Moreover, most attacks against the IoT devices occur at a communications protocol layer, and cause great difficulty to security detection.

Based on such a situation, some embodiments of the present specification propose a solution for configuring a control device on the IoT network considering that it is relatively difficult to implement the security detection function on the IoT devices, so that the IoT control device can implement security detection for each IoT device. In the IoT network, different IoT devices may use different communications protocols. However, most of the IoT devices communicate with each other by using wireless signals, and most attacks against the IoT devices are performed on wireless channels.

Figure 1B:
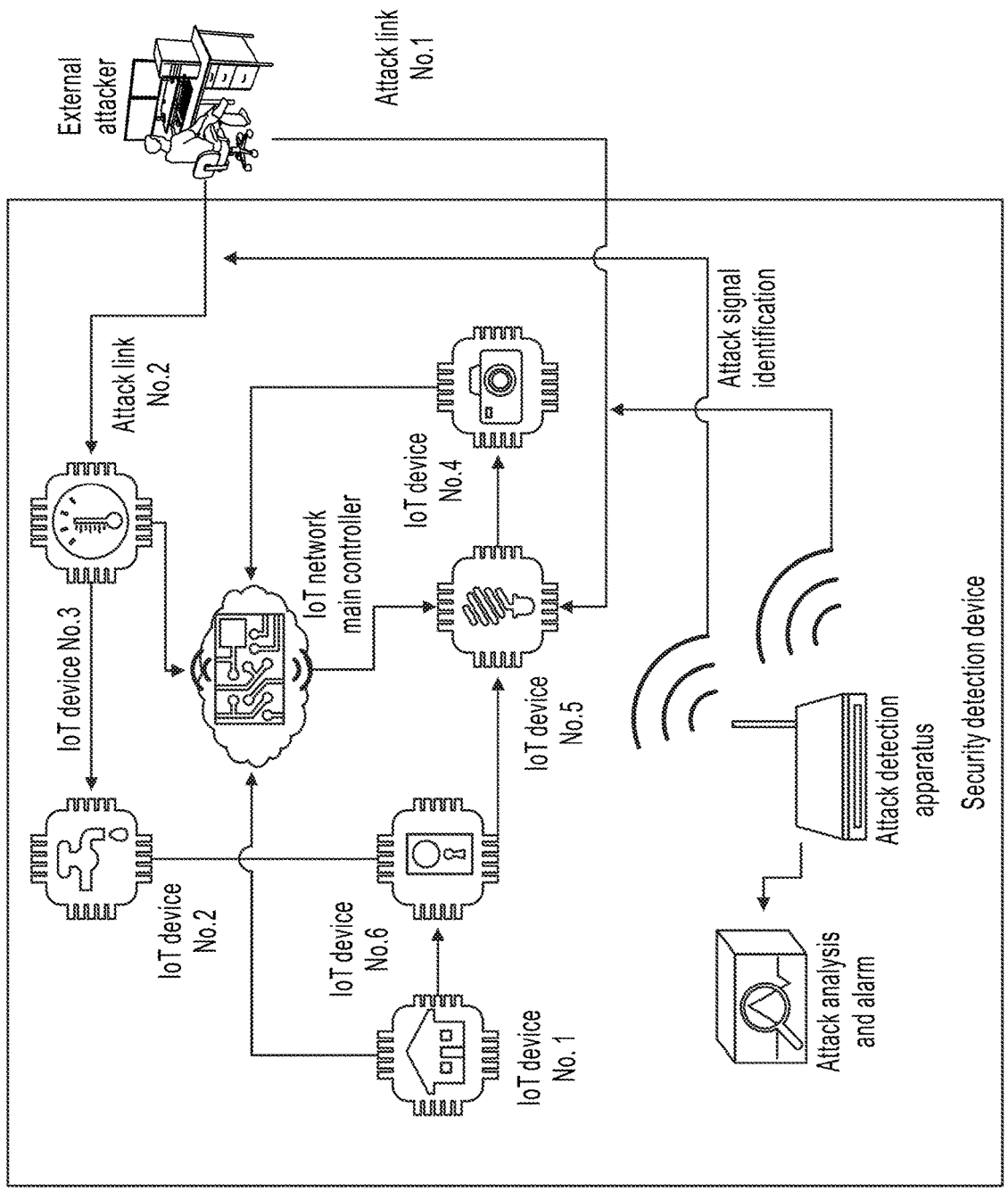
FIG. 1B is a schematic diagram illustrating an IoT network system, according to some example embodiments of the present specification.

FIG. 1B is a schematic diagram illustrating an IoT network, according to some example embodiments of the present specification. In some embodiments, one additional security detection device is added to the IoT network. The security detection device can perform security detection on IoT devices in the IoT network. Therefore, the security detection device does not intrude and is not in contact with the IoT devices, and does not need to rely on detection capabilities of the IoT devices. Certainly, in other examples, the security detection device can also be implemented by using a certain existing device in the IoT network. However, it can be understood that the device additionally provides a new security detection function for the IoT devices in the original IoT network.

Figure 1C:
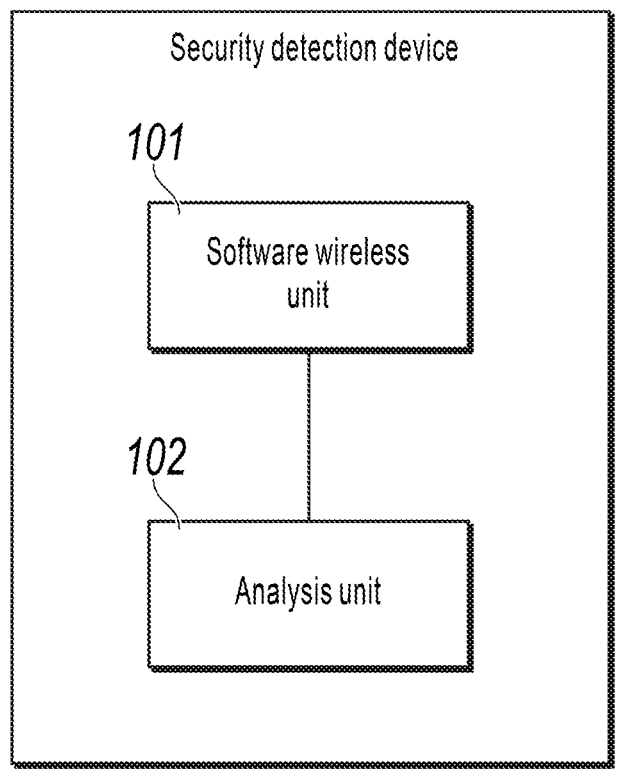
FIG. 1C is a block diagram illustrating a security detection device, according to some example embodiments of the present specification.

FIG. 1C is a block diagram illustrating a security detection device, according to some example embodiments of the present specification. The security detection device includes the following: a software wireless unit 101, configured to monitor a wireless signal sent by the IoT device to obtain a wireless message; and an analysis unit 102, configured to determine a target running feature of the IoT device by using the wireless message, and compare the target running feature with a historical normal running feature of the IoT device to determine whether the IoT device runs abnormally.

For attacked IoT devices, some conventional security detection solutions are to improve the IoT devices themselves in order to improve security protection capabilities of the IoT devices. Due to the limitations of IoT devices, these IoT devices have relatively weak security detection capabilities. Or, it can be understood that hardware capabilities/computing capabilities of the IoT devices are lower than a specified parameter. In solutions proposed in some embodiments, one new security detection device is added, and is configured to detect IoT devices in the IoT network. The IoT devices in the IoT network send wireless signals. The security detection device monitor all wireless signals within a wireless coverage area of the security detection device, and identify whether the IoT devices are abnormal by using the wireless signals obtained through monitoring.

In some embodiments, the security detection device includes a software wireless unit. In specific implementation, a broadband software wireless tool such as a universal software radio peripheral (USRP) and software defined radio (LimeSDR) can be used. A function of the software wireless unit is to detect wireless signals at all wireless frequencies in a security protection area, and distinguish and filter wireless signals to restore wireless messages corresponding to communications protocols used by each IoT device. The communications protocol used by the IoT device mainly includes a Wi-Fi protocol, a Bluetooth protocol, or a Zigbee protocol, etc. Therefore, wireless messages of all IoT devices and wireless messages sent by attackers in the IoT network are collected and filtered by the unit. The software wireless unit can obtain wireless messages sent by different IoT devices, and can further distinguish between the wireless messages based on communications protocols used.

A wireless message acquisition result of the software wireless unit can be output to the analysis unit. The analysis unit can determine the target running feature of the IoT device by using the wireless message, and compare the target running feature with the historical normal running feature of the IoT device to determine whether the IoT device runs abnormally. Optionally, in some embodiments, the historical normal running feature of the IoT device can be pre-analyzed. An analysis purpose is to determine normal running cases of the IoT device in order to monitor, based on the historical normal running feature, whether the IoT device runs abnormally.

Optionally, the historical normal running feature of the IoT device can be implemented in multiple ways. As an example, running data of each IoT device in the IoT network can be continuously monitored within a specific time range (it needs to be ensured that the IoT device is in a normal running state), and a normal running feature of the IoT device can be analyzed based on the running data. In some other examples, the historical normal running feature can be obtained by obtaining and analyzing logs of the IoT device, or can be obtained by further combining test data of the IoT device provided by a manufacturer of the IoT device. Alternatively, historical normal running data of other IoT devices can be obtained in other ways, and the historical normal running feature can be obtained through analysis in combination with correlations between the IoT device to be monitored and the other devices.

In actual applications, if an attacker appears in the IoT network, a quantity of IoT devices in the IoT network may change. For example, a new IoT device is added as an attacker device, or an existing IoT device turns offline after being attacked. Therefore, the historical normal running feature of the IoT device can include a quantity variation feature of IoT devices in an IoT network. The quantity variation feature indicates an IoT device quantity variation in the IoT network in normal cases. For example, a value of the IoT device quantity usually does not change from 10:00 PM to 8:00 AM, and in some time periods, for example, in daytime, the value of the IoT device quantity usually decreases (for example, the quantity decreases as smart wristbands worn by users is turned offline).

In some other examples, certain IoT devices may sign in or turn offline at a fixed time. For example, in a home scenario, a user wears a smart wristband, and the user is usually not at home in a certain time period. Consequently, such a device signs in or signs off at a fixed time. Therefore, the historical normal running feature of the IoT device can further include an IoT device's sign-in and sign-off time feature, and whether the IoT device runs abnormally can be determined based on a sign-in and sign-off time.

In other examples, wireless messages of an IoT device may be dedicated to a certain IoT device. For example, in a home scenario, wireless messages of a camera are usually sent to a router, and wireless messages of a smart wristband are usually sent to a smartphone. If an IoT device with a fixed recipient sends wireless messages to a newly added IoT device, the IoT device may run abnormally. Therefore, the historical normal running feature of the IoT device can further include an IoT device's wireless message recipient feature.

In other examples, a message throughput of IoT devices in the IoT network is generally in a stable state in normal cases. For example, in a household, intelligent industrial control, or unmanned retail store scenario, the throughput generated by IoT devices from 10:00 PM to 8:00 AM is usually low, and no frequent communication occurs. For example, a message throughput of a certain IoT device is relatively stable in each time period of a day. If the IoT device is attacked, the IoT device may frequently send wireless messages to an attacker device. Therefore, a throughput between IoT devices can be counted to further analyze a message throughput variation feature.

Wireless messages sent by an IoT device include data, and the data may be processed by using rules (for example, some encryption algorithms) customized by a manufacturer of the IoT device. In actual applications, not customized rules of all IoT device manufacturers can be determined, and an actual service meaning of the data may not be parsed. In the above-mentioned embodiments, the historical normal running feature is used, which relates to a wireless message quantity variation and a wireless message throughput variation, etc., but does not involve a specific service meaning in the data. The data in the messages does not need to be parsed at a service layer. Therefore, the historical normal running feature can be applied to all IoT devices.

When the customized rules are known (for example, because the security detection device and the IoT device are provided by a same manufacturer; or through cooperation with a manufacturer of the IoT device; or through cracking), the data in the wireless messages sent by the IoT device can alternatively be formatted into data with a service meaning. In this case, service data of the IoT device can be analyzed based on historical running data and a service feature can be determined. For example, a service feature of a smart wristband is sending a response result message or transmitting collected data such as a quantity of steps and a heart rate after receiving an instruction from an associated device. If it is identified that the smart wristband sends device information of its associated device to other devices, the smart wristband may run abnormally.

In actual applications, alternatively, the security detection device can directly communicate with IoT devices. Some IoT devices have the security detection function, and can detect whether the IoT devices themselves are attacked. The IoT devices can notify the security detection device of attack information or transmit some data. However, how to notify the security detection device after the IoT devices discover that they are attacked becomes a difficult problem, because the entire IoT devices are already controlled by the attacker, and data transmission to the security detection device may be perceived by the attacker. Based on such a situation, some embodiments provide solutions from a communications protocol perspective. Generally, both communication parties transmit messages with data based on a communications protocol, and the communications protocol is a series of rules agreed upon to ensure effective and reliable communication between both communication parties in a data communications network. These rules include a message format, a sequence or rate, data transmission confirmation or rejection, error detection, retransmission control, or query, etc.

Generally, a message includes a verification code field used to check whether the message is incorrect. A verification process can be as follows: A communication sender calculates a verification code for to-be-transmitted data by using a verification rule specified in a predetermined communications protocol. After receiving the message, a communication recipient calculates a verification code for the data in the message by using the verification rule, and determines through comparison whether the calculated verification code is consistent with the verification code in the message.

In normal cases, a verification code in a wireless message is generated by using a verification rule of a predetermined communications protocol. Therefore, the historical normal running feature can include the following: A verification code in the wireless message is generated by using a verification rule of a predetermined communications protocol. In some embodiments, to achieve private data transmission, the IoT device can modify the verification code field based on private rules, so that a verification code is different from the verification code generated by using the verification rules specified in the communications protocol that may be controlled by an attacker. The private rule is different from the verification rule specified in the communications protocol, and specific implementation of the private rule can be flexibly configured as needed in actual applications, so that a verification code generated by using the private rule is different from the verification code generated by using the verification rule specified in the communications protocol. Fields other than the verification code field in the wireless message are generated by using the original predetermined communications protocol. For example, the private rule can be performing certain modification after a verification code is generated by using a verification rule, for example, performing other conversion after a verification code is generated by using a verification rule. Optionally, a character conversion relationship can be set, and the verification code generated based on the verification rule can be converted into other characters. In some other examples, the private rule can be encrypting the alarm data by using a predetermined key and generating a verification code for the encrypted data by using the verification rule. In some embodiments, the IoT device and the security detection device can pre-agree on a key (which can be a symmetric key or an asymmetric key). In a verification code generation process, after the predetermined key is used to encrypt the alarm data (a specific encryption algorithm can be flexibly configured), a verification code can be generated for the encrypted data based on the verification rule. In such a method, the verification code can be modified, so that the security detection device can use the verification code to check whether the data is incorrect. The attacker device will consider that an incorrect message is received, without perceiving that the IoT device sends the alarm data. The IoT control device can use the private rule to parse out the alarm data in the message, thereby implementing secret alarm data transmission.

Therefore, the security detection device can receive various types of messages sent by IoT devices. These messages include normal messages, and also include secretly transmitted messages described in the above-mentioned embodiments. The security detection device needs to identify the messages. Based on stipulations in a communications protocol, after receiving a message, the security detection device checks a verification code in the message by using a verification rule specified in the communications protocol. As a verification code of an alarm message is modified, the check fails. In the solutions of some embodiments, if the check fails, the security detection device can parse the verification code by using a private rule. If the parsing succeeds, it can be determined that the IoT device sends a private message. Therefore, it can be determined that the target running feature of the IoT device includes transmitting a private message, and secret data in the message can be further obtained. The security detection device can know that the IoT device may be attacked. Further, the security detection device can troubleshoot and block attack behavior.

In actual applications, if an attacker device needs to attack an IoT device, the attack behavior may be slightly different from normal communication behavior. Therefore, in some embodiments, attack-related features can be collected in advance. In some examples, a wireless message sent by the attacker device to the IoT device may include an attack instruction, such as a Deauth attack instruction in the Wi-Fi protocol. Therefore, an attack instruction feature can be determined based on the attack instruction. In some other examples, the attack behavior can include a replay attack, a denial of service attack, and a password cracking attack, etc. A wireless signal feature of such attack behavior can be obtained and set as an attack behavior feature. In other examples, the attacker device may send interference signals to interfere with signal transmission of the IoT devices in the IoT network. Interfering methods may include co-channel interference, adjacent-channel interference, out-of-band interference, intermodulation interference, and blocking interference, etc. Therefore, an interference signal feature can be determined.

It can be understood from the above-mentioned embodiments that, there can be multiple running features. When the analysis unit analyzes the acquisition result of the software wireless unit, the IoT device may have one target running feature that does not match a historical normal running feature, or may have multiple target running features that do not match historical normal running features. The analysis unit can perform summarization, analysis, and decision-making, and further send a final analysis result to a serving side.

Corresponding to the above-mentioned embodiments of the IoT network system, the present specification further provides some embodiments of a security detection method. FIG. 2 is a flowchart illustrating the security detection method, according to some example embodiments of the present specification. The security detection method can be applied to the security detection device shown in FIG. 1B, and include the following steps:

Step 202: Obtain a wireless message of an IoT device, where the wireless message is obtained by monitoring, by using a software wireless technology, a wireless signal sent by the IoT device.

Step 204: Determine a target running feature of the IoT device by using the wireless message, and compare the target running feature with a historical normal running feature of the IoT device to determine whether the IoT device runs abnormally.

Optionally, the target running feature/the historical normal running feature includes one or more of the following: a quantity variation feature of IoT devices in an IoT network, an IoT device's wireless message recipient feature, an IoT device's wireless message throughput variation feature, an IoT device's sign-in and sign-off time feature, or an IoT device's service feature.

Optionally, determining a target running feature of the IoT device by using the wireless message includes the following: if a verification code fails to be verified by verification rules provided by a predetermined communications protocol, but is subsequently verified by private rules, determining that the target running feature of the IoT device includes transmitting a private message.

Optionally, the target running feature/the historical normal running feature includes one or more of the following attack features: an attack instruction feature, a specified attack behavior feature, or an interference signal feature.

Optionally, a hardware capability/a computing capability of the IoT device is less than a specified parameter.

Corresponding to the above-mentioned embodiments of the security detection method, the present specification further provides embodiments of a security detection apparatus and a device that applies the security detection apparatus.

Figure 3:
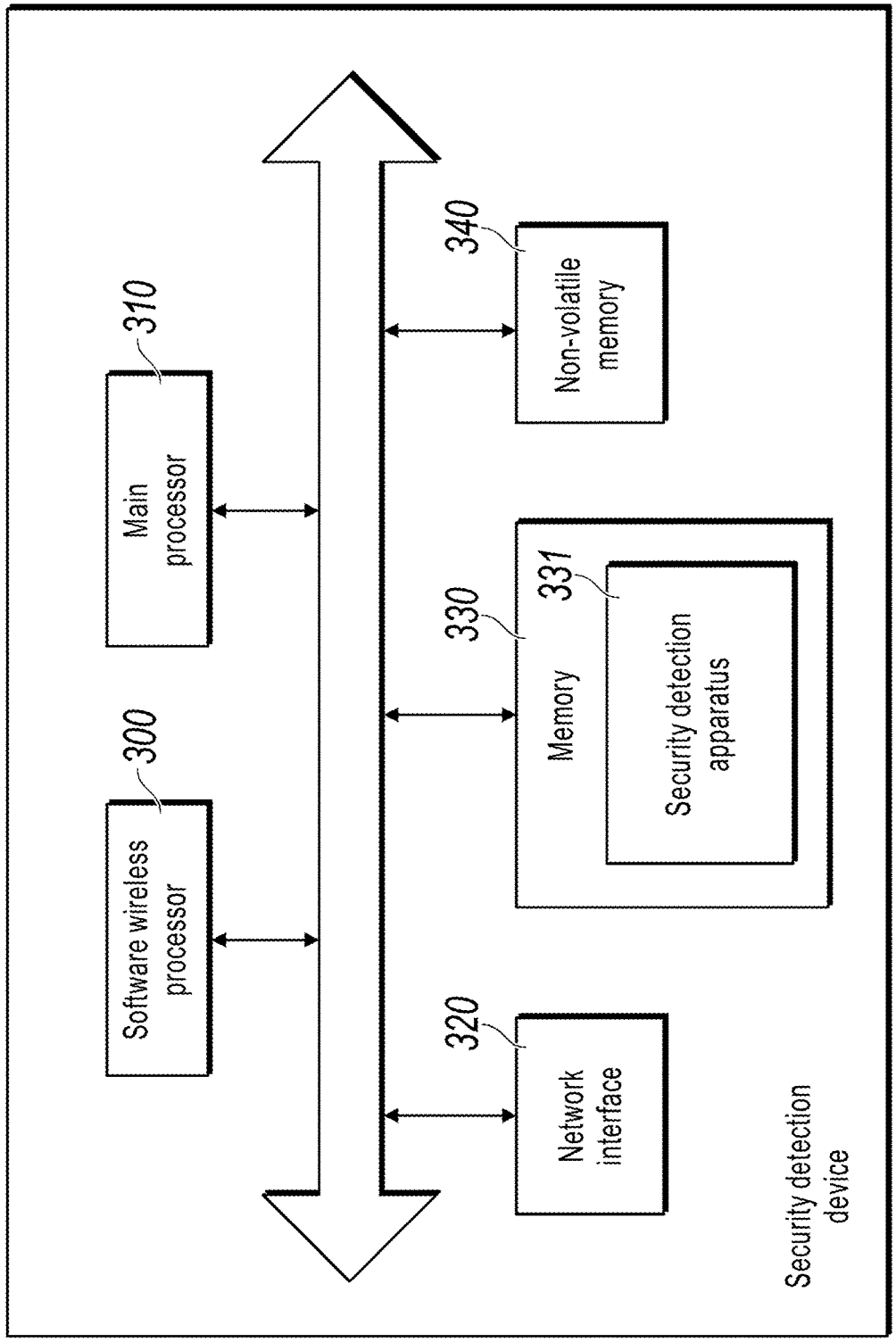
FIG. 3 is a hardware structural diagram illustrating a device including a security detection apparatus, according to some embodiments of the present specification.

Some embodiments of the security detection apparatus of the present specification can be applied to electronic devices. The apparatus embodiments can be implemented by software, hardware, or a combination of hardware and software. Software implementation is used as an example. As a logical device, the apparatus is formed by reading a corresponding computer program instruction in a non-volatile memory to a memory by a main processor. In a hardware aspect, FIG. 3 is a hardware structural diagram illustrating a device including a security detection apparatus, according to some embodiments of the present specification. In addition to a software wireless processor 300, a main processor 310, a memory 330, a network interface 320, and a non-volatile memory 340 shown in FIG. 3, an electronic device including an apparatus 331 in some embodiments generally can further include other hardware based on actual functions of the device. Details are omitted here for simplicity.

Figure 4:
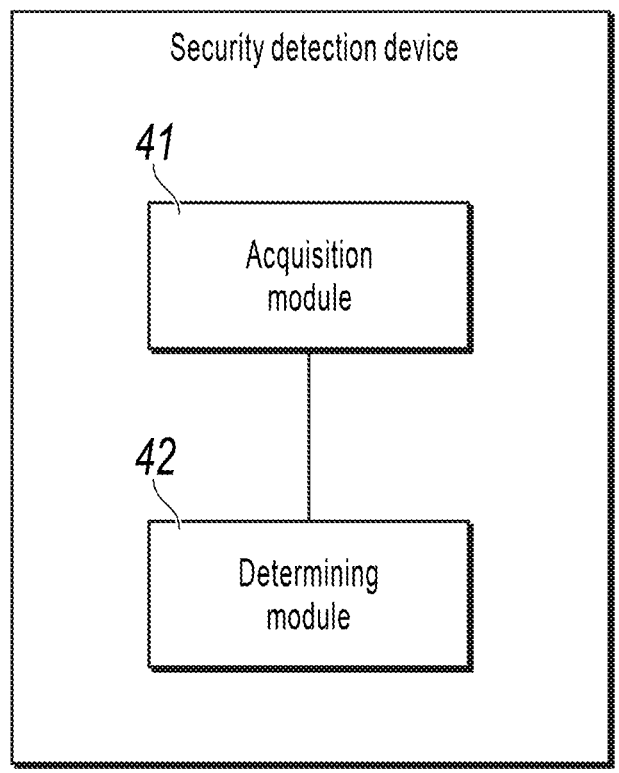
FIG. 4 is a block diagram illustrating a security detection apparatus, according to some example embodiments of the present specification.

FIG. 4 is a block diagram illustrating a security detection apparatus, according to some example embodiments of the present specification. The apparatus includes the following: an acquisition module 41, configured to obtain a wireless message of an IoT device, where the wireless message is obtained by monitoring, by using a software wireless technology, a wireless signal sent by the IoT device; and a determining module 42, configured to determine a target running feature of the IoT device by using the wireless message, and compare the target running feature with a historical normal running feature of the IoT device to determine whether the IoT device runs abnormally.

Optionally, the target running feature/the historical normal running feature includes one or more of the following: a quantity variation feature of IoT devices in an IoT network, an IoT device's wireless message recipient feature, an IoT device's wireless message throughput variation feature, an IoT device's sign-in and sign-off time feature, or an IoT device's service feature.

Optionally, the determining module is further configured to, if a verification code fails to be verified by verification rules provided by a predetermined communications protocol, but is subsequently verified by private rules, determine that the target running feature of the IoT device includes transmitting a private message.

Optionally, the target running feature/the historical normal running feature includes one or more of the following attack features: an attack instruction feature, a specified attack behavior feature, or an interference signal feature.

Optionally, a hardware capability/a computing capability of the IoT device is less than a specified parameter.

Correspondingly, the present specification further provides a security detection device, including a software wireless processor, a memory, a main processor, and a computer program that is stored in the memory and that is capable of running on the main processor, where when executing the program, the main processor implements the following method: obtaining a wireless message of an IoT device, where the wireless message is obtained by monitoring, by using the software wireless processor, a wireless signal sent by the IoT device; and determining a target running feature of the IoT device by using the wireless message, and comparing the target running feature with a historical normal running feature of the IoT device to determine whether the IoT device runs abnormally.

For an implementation process of each step in the above-mentioned security detection method and an implementation process of a function and role of each module in the security detection apparatus, reference can be made to the implementation process of the above-mentioned IoT network system. Details are omitted here for simplicity.

The described apparatus embodiments are merely examples of apparatus embodiments. The modules described as separate parts can be or does not have to be physically separate, and parts displayed as modules can be or does not have to be physical modules, and can be located in one location or distributed on a plurality of network modules. Some or all of the modules can be selected based on actual requirements to achieve the objectives of the solutions of the present specification. A person of ordinary skill in the art can understand and implement some embodiments of the present specification without creative efforts.

Specific embodiments of the present specification are described above. Other embodiments fall within the scope of the appended claims. In some situations, the actions or steps described in the claims can be performed in an order different from the order in some embodiments and the desired results can still be achieved. In addition, the process depicted in the accompanying drawings does not necessarily need a particular execution order to achieve the desired results. In some implementations, multi-tasking and concurrent processing are feasible or can be advantageous.

Other implementation solutions of the present specification will readily occur to a person skilled in the art upon consideration of the present specification and practice of the specification as applied here. The present specification is intended to cover any variation, use, or adaptation of the present specification that conforms to general principles of the present specification and that includes common general knowledge or a technical means in the art that is not claimed in the present specification. The present specification and some embodiments are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The previous descriptions are merely preferred embodiments of the present specification, but are not intended to limit the present specification. Any modification, equivalent replacement, or improvement made without departing from the spirit and principle of the present specification shall fall within the protection scope of the present specification.

What is claimed is:

1. A computer-implemented method, comprising:
   obtaining, by one or more processors, a wireless message of an Internet of Things (IoT) device by monitoring a wireless signal sent by the IoT device, wherein the wireless message comprises a first verification code generated by the IoT device;
   determining, by the one or more processors, a target running feature of the IoT device based on the wireless message, wherein determining the target running feature comprises
      generating a second verification code,
      performing a security check of the wireless message based on the first verification code and the second verification code,
      determining that the security check fails,
      responsive to determining that the security check fails, performing an additional security check of the wireless message based on a private verification rule,
      determining that the additional security check succeeds, and
      subsequent to determining that the additional security check succeeds,
         parsing the first verification code to obtain a parsing result, and
         obtaining an alarm message from the wireless message based on the parsing result;
   comparing, by the one or more processors, the target running feature with a historical normal running feature of the IoT device;
   determining, by the one or more processors, whether the IoT device runs abnormally based on the comparing of the target running feature with the historical normal running feature of the IoT device; and
   in response to determining that the IoT device runs abnormally, generating and transmitting, by the one or more processors, an analysis result of the IoT device.

2. The computer-implemented method of claim 1, wherein each of the target running feature and the historical normal running feature comprises one or more of the following:
   a quantity variation feature indicating a quantity of IoT devices in an IoT network, an IoT device's wireless message recipient feature indicating an identity of a recipient for the wireless message, an IoT device's wireless message throughput variation feature indicating throughput of the IoT network, an IoT device's sign-in and sign-off time feature indicating a time for the IoT device to sign-in and sign-off, or an IoT device's service feature indicating a service based on customized rules.

3. The computer-implemented method of claim 1, further comprising:
   collecting attack-related features comprising an attack instruction feature, an attack behavior feature, or an interference signal feature.

4. The computer-implemented method of claim 1, wherein a hardware capability or a computing capability of the IoT device is less than a specified level.

5. The computer-implemented method of claim 1, wherein the IoT device is located within a security protection area that is covered by the one or more processors.

6. The computer-implemented method of claim 1, wherein obtaining the wireless message of the IoT device comprises:
   detecting, by the one or more processors, wireless signals at a plurality of wireless frequencies in a security protection area; and
   obtaining, by the one or more processors, the wireless message of the IoT device by distinguishing and filtering the wireless signals based on a communications protocol used by the IoT device.

7. A non-transitory, computer-readable medium storing one or more instructions executable by a computer system to perform operations comprising:
   obtaining a wireless message of an Internet of Things (IoT) device by monitoring a wireless signal sent by the IoT device, wherein the wireless message comprises a first verification code generated by the IoT device;
   determining a target running feature of the IoT device based on the wireless message, wherein determining the target running feature comprises
      generating a second verification code,
      performing a security check of the wireless message based on the first verification code and the second verification code,
      determining that the security check fails,
      responsive to determining that the security check fails, performing an additional security check of the wireless message based on a private verification rule,
      determining that the additional security check succeeds,
      subsequent to determining that the additional security check succeeds,
         parsing the first verification code to obtain a parsing result, and
         obtaining an alarm message from the wireless message based on the parsing result;

comparing the target running feature with a historical normal running feature of the IoT device;

determining whether the IoT device runs abnormally based on the comparing of the target running feature with the historical normal running feature of the IoT device; and in response to determining that the IoT device runs abnormally, generating and transmitting an analysis result of the IoT device.

8. The non-transitory, computer-readable medium of claim 7, wherein each of the target running feature and the historical normal running feature comprises one or more of the following:

a quantity variation feature indicating a quantity of IoT devices in an IoT network, an IoT device's wireless message recipient feature indicating an identity of a recipient for the wireless message, an IoT device's wireless message throughput variation feature indicating throughput of the IoT network, an IoT device's sign-in and sign-off time feature indicating a time for the IoT device to sign-in and sign-off, or an IoT device's service feature indicating a service based on customized rules.

9. The non-transitory, computer-readable medium of claim 7, wherein the operations further comprise:

collecting attack-related features comprising an attack instruction feature, a specified attack behavior feature, or an interference signal feature.

10. The non-transitory, computer-readable medium of claim 7, wherein a hardware capability or a computing capability of the IoT device is less than a specified level.

11. The non-transitory, computer-readable medium of claim 7, wherein the IoT device is located within a security protection area.

12. The non-transitory, computer-readable medium of claim 7, wherein obtaining the wireless message of the IoT device comprises:

detecting wireless signals at a plurality of wireless frequencies in a security protection area; and obtaining the wireless message of the IoT device by distinguishing and filtering the wireless signals based on a communications protocol used by the IoT device.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining a wireless message of an Internet of Things (IoT) device by monitoring a wireless signal sent by the IoT device, wherein the wireless message comprises a first verification code generated by the IoT device;

determining a target running feature of the IoT device based on the wireless message wherein determining the target running feature comprises
generating a second verification code,
performing a security check of the wireless message based on the first verification code and the second verification code,
determining that the security check fails, responsive to determining that the security check fails, performing an additional security check of the wireless message based on a private verification rule, determining that the additional security check succeeds, and subsequent to determining that the additional security check succeeds,
parsing the first verification code to obtain a parsing result, and
obtaining an alarm message from the wireless message based on the parsing result;

comparing the target running feature with a historical normal running feature of the IoT device;

determining whether the IoT device runs abnormally based on the comparing of the target running feature with the historical normal running feature of the IoT device; and in response to determining that the IoT device runs abnormally, generating and transmitting an analysis result of the IoT device.

14. The computer-implemented system of claim 13, wherein each of the target running feature and the historical normal running feature comprises one or more of the following:

a quantity variation feature indicating a quantity of IoT devices in an IoT network, an IoT device's wireless message recipient feature indicating an identity of a recipient for the wireless message, an IoT device's wireless message throughput variation feature indicating throughput of the IoT network, an IoT device's sign-in and sign-off time feature indicating a time for the IoT device to sign-in and sign-off, or an IoT device's service feature indicating a service based on customized rules.

15. The computer-implemented system of claim 13, wherein the one or more operations further comprise:

collecting attack-related features comprising an attack instruction feature, a specified attack behavior feature, or an interference signal feature.

16. The computer-implemented system of claim 13, wherein a hardware capability or a computing capability of the IoT device is less than a specified level.

17. The computer-implemented system of claim 13, wherein the IoT device is located within a security protection area.

18. The computer-implemented method of claim 1, wherein the first verification code comprises an initial verification code that has been modified according to the private verification rule.

19. The computer-implemented method of claim 18, wherein the initial verification code is generated according to a communication protocol verification rule specified in a first communication protocol, wherein the second verification code is generated according to the communication protocol verification rule, and wherein the communication protocol verification rule is different than the private verification rule.

* * * * *

UNITED STATES PATENT AND TRADEMARK OFFICE
CERTIFICATE OF CORRECTION

PATENT NO.        : 11,201,886 B2
APPLICATION NO.   : 17/082813
DATED             : December 14, 2021
INVENTOR(S)       : Hao Zhao Page 1 of 1

It is certified that error appears in the above-identified patent and that said Letters Patent is hereby corrected as shown below:

On the Title Page

Column 2 (Item (56) Other Publications), Line 4, delete "URL http" and insert -- URL <http --.

Column 2 (Item (56) Other Publications), Line 4, delete "/cantent/" and insert -- /content/ --.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*